(12) United States Patent
Bucholz

(10) Patent No.: US 8,872,768 B2
(45) Date of Patent: Oct. 28, 2014

(54) INPUT DEVICE

(75) Inventor: Richard D. Bucholz, Ladue, MO (US)

(73) Assignee: St. Louis University, St. Louis, MO (US)

( * ) Notice: Subject to any disclaimer, the term of this patent is extended or adjusted under 35 U.S.C. 154(b) by 185 days.

(21) Appl. No.: 13/447,919

(22) Filed: Apr. 16, 2012

(65) Prior Publication Data

US 2012/0287041 A1 Nov. 15, 2012

Related U.S. Application Data

(60) Provisional application No. 61/475,909, filed on Apr. 15, 2011.

(51) Int. Cl.
| | | |
|---|---|---|
| *G06F 3/033* | (2013.01) | |
| *G09G 5/08* | (2006.01) | |
| *G06F 3/0354* | (2013.01) | |
| *G06F 3/03* | (2006.01) | |

(52) U.S. Cl.
CPC ...... *G06F 3/0317* (2013.01); *G06F 2203/0335* (2013.01); *G06F 3/0354* (2013.01); *G06F 3/033* (2013.01); *G06F 2203/0331* (2013.01); *G06F 3/03543* (2013.01)
USPC ........................................................ 345/166

(58) Field of Classification Search
USPC ................................................ 345/156, 166
See application file for complete search history.

(56) References Cited

U.S. PATENT DOCUMENTS

| | | | |
|---|---|---|---|
| 5,706,026 A | 1/1998 | Kent et al. | |
| 6,304,840 B1 | 10/2001 | Vance et al. | |
| 6,373,047 B1 * | 4/2002 | Adan et al. | 250/221 |
| 7,012,593 B2 | 3/2006 | Yoon et al. | |
| 7,810,504 B2 | 10/2010 | Guzman | |

(Continued)

OTHER PUBLICATIONS

Bowman, D.A. et al., "Novel Uses of Pinch Gloves (TM) for Virtual Environment Interaction Techniques", Virtual Reality, vol. 6, Issur 3, dated Oct. 2002; pp. 122-129.

(Continued)

*Primary Examiner* — Dwayne Bost
*Assistant Examiner* — Christopher Kohlman
(74) *Attorney, Agent, or Firm* — Senniger Powers LLP

(57) ABSTRACT

An input device for use in controlling medical equipment controlled by a mouse. The device includes an elastic finger cot having an interior sized and shaped for selectively receiving and retaining a user's finger. The device has a light emitting diode for emitting a beam of light to illuminate a selected surface and a light sensor for sensing a light reflected from the selected surface to detect movement of the sensor and finger cot relative to the surface and producing a signal corresponding to the detected movement. The device includes a transmitter for receiving the signal from the light sensor corresponding to the detected movement and generating an electromagnetic signal corresponding to the light sensor signal for receipt by the medical equipment. A power supply connected to the diode, the sensor, and the transmitter provides power. The medical equipment views the input device as the mouse controlling the medical equipment.

8 Claims, 3 Drawing Sheets

(56) References Cited

U.S. PATENT DOCUMENTS

| | | |
|---|---|---|
| 2003/0006962 A1 | 1/2003 | Bajramovic |
| 2003/0174124 A1 | 9/2003 | How |
| 2003/0214481 A1* | 11/2003 | Xiong .......................... 345/157 |
| 2004/0125076 A1 | 7/2004 | Green |
| 2006/0012567 A1* | 1/2006 | Sicklinger .................... 345/157 |
| 2006/0033710 A1* | 2/2006 | Bajramovic ................. 345/156 |
| 2006/0077175 A1 | 4/2006 | Pilu |
| 2007/0262958 A1 | 11/2007 | Cai et al. |
| 2008/0136775 A1 | 6/2008 | Conant |
| 2008/0259028 A1 | 10/2008 | Teepell et al. |
| 2009/0096746 A1* | 4/2009 | Kruse et al. .................. 345/156 |
| 2009/0146951 A1 | 6/2009 | Welland |
| 2010/0013812 A1 | 1/2010 | Gu et al. |

OTHER PUBLICATIONS

Written Opinion regarding PCT/US2012/033275 dated Jun. 20, 2012; 5 pages.

PCT International Search Report regarding PCT/US2012/033275 dated Jun. 20, 2012, 2 pages.

Indiamart Article, "Finger Mouse", Shenzhen, China, http://trade.indiamart.com/details.mp?offer=1702251459, 3 pages.

* cited by examiner

INPUT DEVICE

CROSS REFERENCE TO RELATED APPLICATION

This Application claims priority under 35 U.S.C. §119(e) from U.S. Provisional Patent Application No. 61/475,909 filed on Apr. 15, 2011, which is hereby incorporated by reference in its entirety.

BACKGROUND

The present invention generally relates to an input device, and more particularly to a finger-mounted input device for use in controlling medical equipment controlled by a mouse.

Computers are frequently used in operating rooms. For example, computers are sometimes used to control medical equipment such as robotic and optical instruments. Various input devices have been used to provide input control to these computers. Because of the environment, the input devices must be capable of sterilization or they must be disposable. Further, the devices should be moisture resistant. In addition, eliminating wires and computer consoles from the operating theater removes clutter and obstructions, but some wireless technologies are susceptible to electromagnetic interference. In the past, input devices such as mouses, trackballs, and joysticks have been used to control operating room computers. In some instances, these devices have been a source of clutter and obstructions. Further, some of these devices are not easily sterilized, presenting concerns related to their use. Therefore, there is a need for an input device for use in controlling medical equipment that overcomes problems inherent with the prior art.

SUMMARY

The present invention relates to an input device for use in controlling medical equipment controlled by a mouse. The device comprises an elastic finger cot having an interior sized and shaped for selectively receiving and retaining a user's finger. Further, the device includes a light emitting diode mounted on the finger cot for emitting a beam of light to illuminate a selected surface. A light sensor mounted on the finger cot senses a light reflected from the selected surface to detect movement of the sensor and finger cot relative to the surface and producing a signal corresponding to the detected movement. The device has a transmitter mounted on the finger cot and operatively connected to the sensor for receiving the signal from the light sensor corresponding to the detected movement and generating an electromagnetic signal corresponding to the light sensor signal for receipt by the medical equipment. A power supply mounted on the finger cot and operatively connected to the diode, the sensor, and the transmitter provides power to the diode, sensor, and transmitter. The medical equipment views the input device as the mouse controlling the medical equipment.

BRIEF DESCRIPTION OF THE DRAWINGS

Corresponding reference characters indicate corresponding parts throughout the drawings.

DETAILED DESCRIPTION OF THE DRAWINGS

Figure 1:
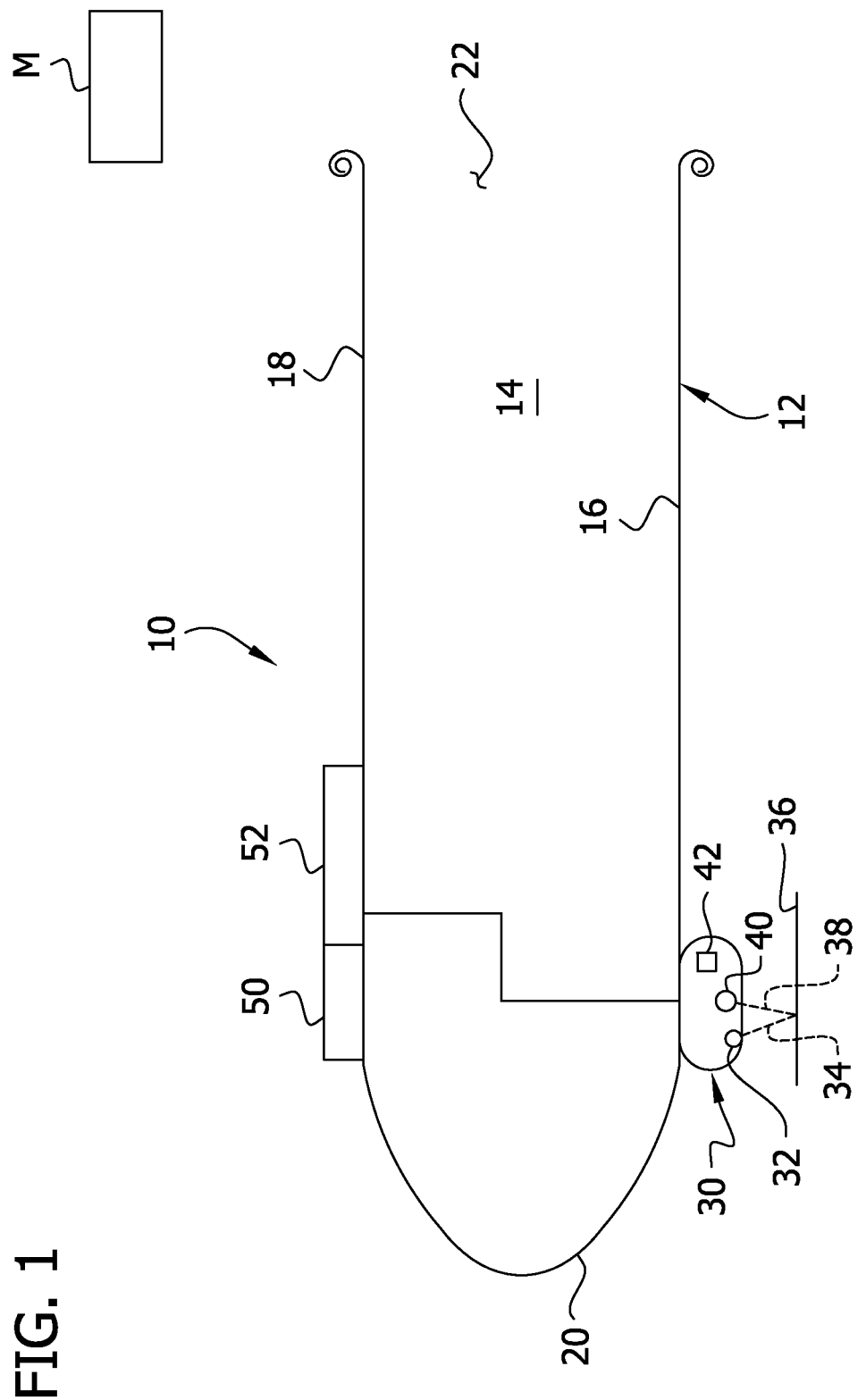
FIG. 1 is a schematic of an input device of one embodiment of the present invention.

Referring to FIG. 1, an input device is designated generally by the reference number 10. The input device 10 is intended to control medical equipment M such as computer controlled surgical instruments, but those skilled in the art will appreciate the device may be used to control other equipment such as personal computers and gaming consoles (not shown) that are conventionally controlled by a mouse. The input device 10 includes an elastic finger cot, generally designated by 12, having an interior 14 defined by an interior surface 16. The interior 14 is sized and shaped for selectively receiving and retaining a user's finger. The finger cot 10 also includes an exterior surface 18 extending between a closed tip 20 and an open end 22. The finger cot 12 is generally similar to conventional, commonly available finger cots except for features as described below. As with conventional cots, the finger cot 12 may be delivered to the user in a rolled configuration so the user can unroll the cot on the selected finger. Although other fingers may be used without departing from the scope of the present invention, in some embodiments the finger selected by the user is an index finger of a non-dominant hand.

An optical mouse unit, generally designated by 30, is mounted on the finger cot 12 adjacent the closed tip 20 at a position generally aligned with a pad corresponding to a distal phalange of a finger inserted in the finger cot. The mouse unit 30 includes a light emitting diode 32 that emits a beam of light, as illustrated by a dashed line designated 34, to illuminate a selected surface 36. As will be appreciated by those skilled in the art, the light is reflected, as illustrated by a dashed line designated 38, from the selected surface 36. The mouse unit 30 also includes a light sensor 40 mounted on the finger cot 12. The sensor 40 is mounted on the finger cot 12 adjacent the diode 30 at the closed tip 20 and generally aligned with the pad of the distal phalange inserted in the finger cot. Further, the sensor 40 is positioned so it is aligned with the light reflected from the selected surface 36. In one embodiment, the light sensor 40 comprises a complimentary metal-oxide semiconductor (CMOS) sensor. The light sensor 40 senses the light 38 reflected from the surface 36 and produces a signal corresponding to an image of the surface. At set intervals, the light sensor 40 produces new signals corresponding to the image of the surface 36. The signals produced by the senor are sent to a digital signal processor 42 (DSP) provided in the mouse unit 30. The processor 42 detects patterns in the image signals and analyzes how the patterns have moved since the prior image. Based on the change in pattern during a sequence of images, the processor 42 determines how far and in what direction the mouse unit 30 has moved. Mouse units similar to that described above are commonly used in desktop personal computer mouse devices. Thus, the mouse unit 30 and its components will not be described in further detail.

A transmitter 50 is mounted on the finger cot 12 and operatively connected to the processor 42 for receiving coordinates from the processor corresponding to the detected movement. The transmitter 50 generates an electromagnetic signal (e.g., an infrared or a radio frequency signal) corresponding to the coordinates for receipt by the medical equipment M. Although the transmitter 50 may use any communication protocol without departing from the scope of the present invention, in some embodiments the transmitter uses a Bluetooth baseband protocol. The medical equipment M views the input device 10 as a mouse controlling the medical equipment. A power supply 52 is also mounted on the finger cot 12 and operatively connected to the diode 30, the sensor 40, the processor 42, and the transmitter 50 for powering them. In some embodiments, the power supply 52 includes a battery. Although the transmitter 50 and power supply 52 may be mounted in other locations without departing from the scope of the present invention, in some embodiments they are mounted on the exterior surface 18 of the cot 12 opposite the mouse unit 30. As the design and operation of each of the elements forming the input device 10 are well within the skill of those in the art, they will not be described in further detail.

Figure 2:
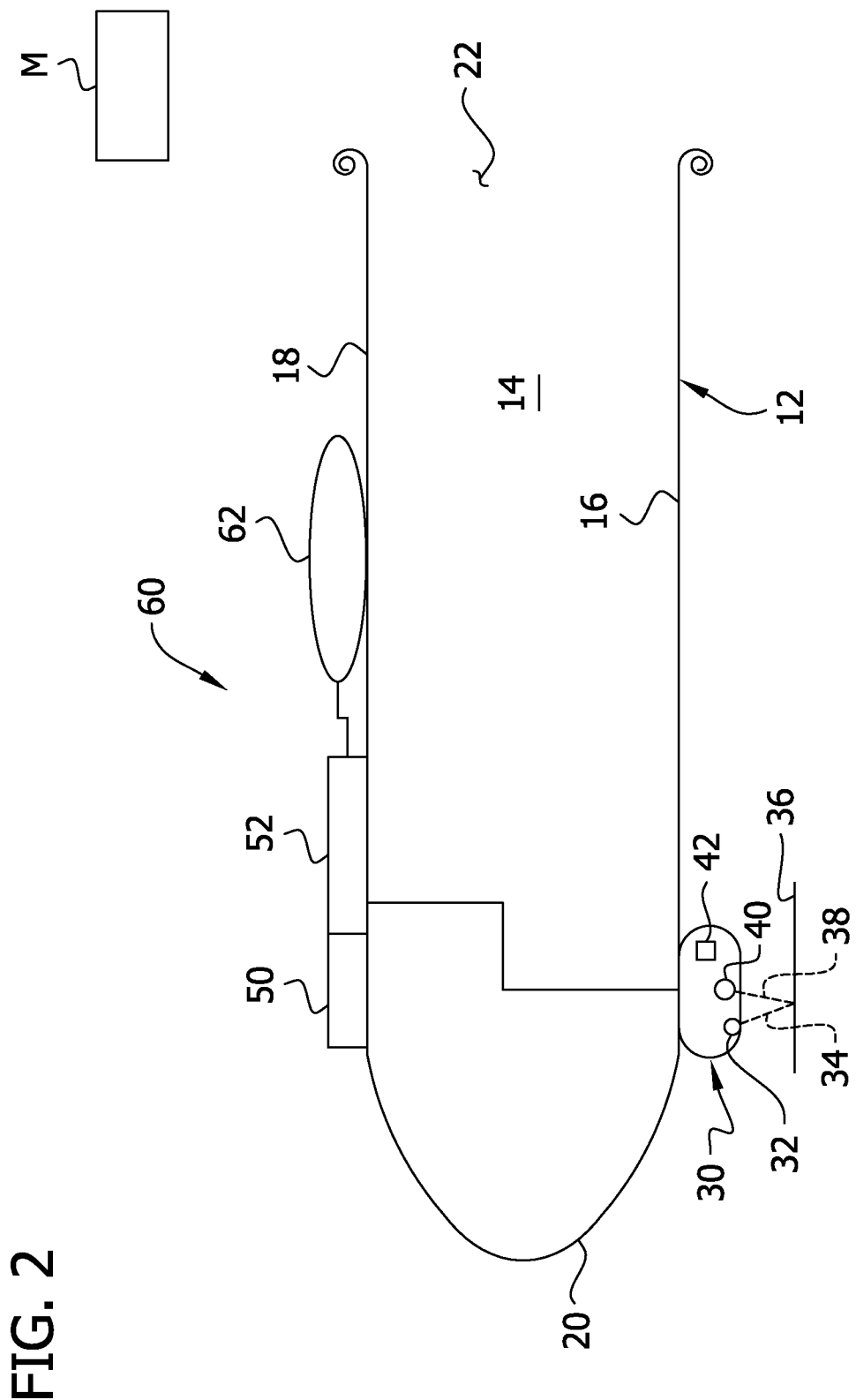
FIG. 2 is a schematic of an alternative embodiment of the input device of the present invention.

In a second embodiment shown in FIG. 2, the input device is designated generally by the reference number 60. The input device 60 of the second embodiment is similar to the input device 10 (FIG. 1) of the first embodiment except that it includes an accelerometer 62 mounted on the cot for sensing acceleration of the finger cot 12 such as occurs when a user snaps his finger or shakes his wrist. The accelerometer 62 generates a voltage signal in response to sensing changes in speed. The transmitter 50 transmits a signal to the medical equipment M, which interprets the signal as a mouse click. In some cases, the transmitter 50 generates an electromagnetic signal when the accelerometer signal exceeds a predetermined limit. Although the accelerometer 62 may be positioned in other locations without departing from the scope of the present invention, in some embodiments the accelerometer is mounted on the exterior surface 18 of the cot 12 opposite the mouse unit 30. As will be appreciated by those skilled in the art, the accelerometer type may be selected to sense the static acceleration of gravity in tilt-sensing applications, as well as dynamic acceleration resulting from motion, shock, or vibration. The input device 60 of the second embodiment is identical to the input device 10 of the first embodiment in all other respects. Therefore, the other features of the input device 60 will not be described in further detail.

In an alternative accelerometer embodiment (not shown), an accelerometer and power source are mounted on a second finger cot separate from the input device 10 shown in FIG. 1. The second finger cot is positioned on a different digit (e.g., a thumb). As the design and operation of this alternative embodiment is apparent from the description of the second embodiment, they will not be described in further detail. It is also envisioned that this alternative embodiment may be used separately from any of the other embodiments.

Figure 3:
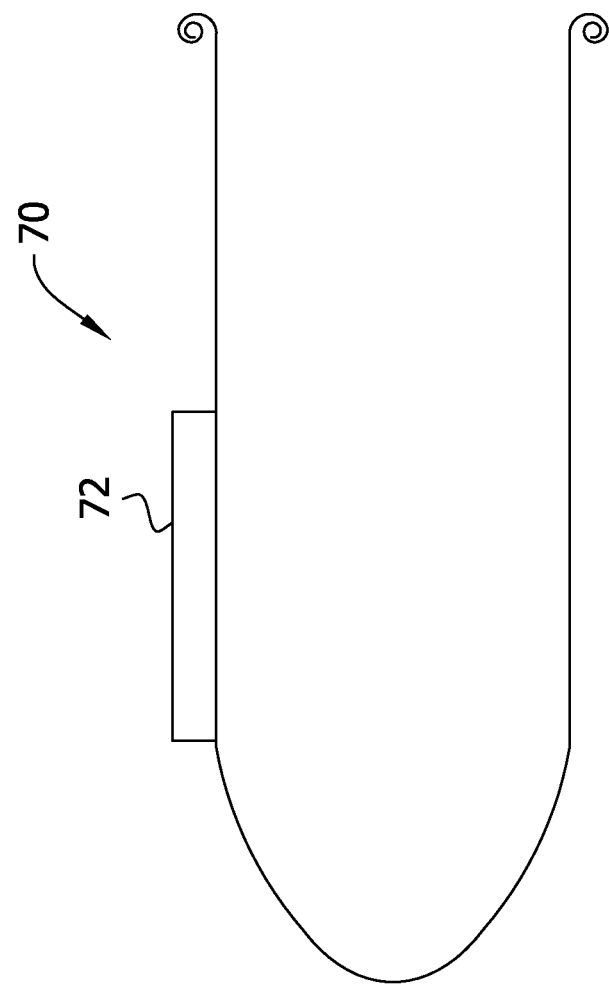
FIG. 3 is a schematic of a second finger cot for use in combination with the input devices illustrated in FIGS. 1 and 2.

FIG. 3 illustrates a finger cot 70 intended for use in combination with either the input device 10 of the first embodiment or the input device 60 of the second embodiment. The finger cot 70 includes a target area, which the sensor 40 reads as a unique feature. As will be appreciated by those skilled in the art, the target 72 may include a predetermined pattern, texture, or a predetermined color so it can be uniquely identified by the sensor. The input device (10, 60) may be configured to interpret the sensor 40 sensing the presence of the target 70 as a mouse click or other input. When the target 72 is positioned on a finger cot 70, the finger cot is sized and shaped for receipt on a thumb of the hand on which the input device (10, 60) is positioned. In some embodiments, the target 72 may be positioned on another article of clothing or on accessible operating room equipment rather than a finger cot without departing from the scope of the present invention.

Having described the invention in detail, it will be apparent that modifications and variations are possible without departing from the scope of the invention defined in the appended claims.

When introducing elements of the present invention or the preferred embodiment(s) thereof, the articles "a", "an", "the", and "said" are intended to mean that there are one or more of the elements. The terms "comprising", "including", and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. An input device for use in controlling medical equipment controlled by a mouse comprising:
   a unitary elastic finger cot having a closed end and an interior sized and shaped for selectively receiving and retaining a user's finger;
   a light emitting diode mounted on the finger cot in position for emitting a beam of light directly on a selected surface to illuminate the selected surface;
   a light sensor mounted on the finger cot in position for sensing a light reflected directly from the selected surface to detect movement of the sensor and finger cot relative to the surface and producing a signal corresponding to the detected movement;
   an accelerometer mounted on the cot for sensing changes in a speed of the finger cot and generating a signal in response to sensing changes in speed, said signal indicative of a selection wherein the medical equipment views the signal as a mouse click;
   a transmitter mounted on the finger cot, operatively connected to the sensor for receiving the signal from the light sensor corresponding to the detected movement and generating an electromagnetic signal corresponding to the light sensor signal for receipt by the medical equipment, and operatively connected to the accelerometer for receiving the signal from the accelerometer in response to the changes in speed and generating an electromagnetic signal corresponding to the accelerometer signal for receipt by the medical equipment and generating an electromagnetic signal when the accelerometer signal exceeds a predetermined limit; and
   a power supply mounted on the finger cot and operatively connected to the diode, the sensor, and the transmitter for providing power thereto;
   wherein the medical equipment views the input device as the mouse controlling the medical equipment.

2. An input device as set forth in claim 1 further comprising a target for selective illumination by the light emitting diode and for providing a predetermined responsive light reflection uniquely sensible by the light sensor as indicating proximity of the finger cot to the target.

3. An input device as set forth in claim 2 wherein said finger cot is a first finger cot and said target is provided on a second finger cot sized and shaped for selectively receiving and retaining a user's thumb.

4. An input device as set forth in claim 2 wherein the target comprises a predetermined pattern.

5. An input device as set forth in claim 2 wherein the target comprises a predetermined color.

6. An input device as set forth in claim 1 wherein the electromagnetic signal generated by the transmitter comprises radio frequency signals.

7. An input device as set forth in claim 6 wherein the transmitter uses a baseband protocol.

8. An input device as set forth in claim 1 wherein the power supply comprises a battery.

\* \* \* \* \*